United States Patent
Thoria et al.

(10) Patent No.: US 11,924,083 B2
(45) Date of Patent: Mar. 5, 2024

(54) MULTIPLE NETWORK INTERFACING

(71) Applicant: Cisco Technology, Inc., San Jose, CA (US)

(72) Inventors: Samir Thoria, Saratoga, CA (US); Neeraj Malhotra, Los Gatos, CA (US); Lukas Krattiger, Pleasanton, CA (US); Ali Sajassi, Alamo, CA (US); Rajesh Sharma, San Jose, CA (US); Kesavan Thiruvenkatasamy, San jose, CA (US); Aparna Pattekar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

(21) Appl. No.: 17/343,697

(22) Filed: Jun. 9, 2021

(65) Prior Publication Data
US 2021/0392069 A1  Dec. 16, 2021

Related U.S. Application Data

(60) Provisional application No. 63/039,825, filed on Jun. 16, 2020.

(51) Int. Cl.
*H04L 45/02* (2022.01)
*H04L 12/46* (2006.01)

(52) U.S. Cl.
CPC .............. *H04L 45/04* (2013.01); *H04L 12/46* (2013.01)

(58) Field of Classification Search
None
See application file for complete search history.

(56) References Cited

U.S. PATENT DOCUMENTS

| | | | |
|---|---|---|---|
| 10,158,567 B1* | 12/2018 | Zhang | H04L 12/4633 |
| 11,050,679 B1* | 6/2021 | Przygienda | H04L 45/48 |
| 2016/0277210 A1 | 9/2016 | Lin | |
| 2018/0176028 A1 | 6/2018 | Tiruveedhula | |
| 2018/0287990 A1* | 10/2018 | Bickhart | H04L 12/4625 |

(Continued)

FOREIGN PATENT DOCUMENTS

CN  109257265 A  1/2019

OTHER PUBLICATIONS

RC 7348, Mahalingam et al. Aug. 2014 (Year: 2014).*

(Continued)

*Primary Examiner* — Jung H Park
(74) *Attorney, Agent, or Firm* — Lee & Hayes P.C.

(57) ABSTRACT

This disclosure describes techniques for enabling interoperability between asymmetric and symmetric Integrated Routing and Bridging (IRB) modes. An interfacing component may be configured to receive a first route advertisement from a first edge node in a Layer-2 (L2) fabric. The first route advertisement may correspond to an asymmetric format route, for instance. The interfacing component may be further configured to receive a second route advertisement from a second edge node in a L2/Layer-3 (L3) fabric. The second edge node may be configured for symmetric integrated routing and bridging (IRB). The interfacing component may be configured to re-originate the first route and the second route such that the interfacing component is included as a hop in the resultant routes between the L2 fabric and the L2/L3 fabric.

20 Claims, 9 Drawing Sheets

(56) References Cited

U.S. PATENT DOCUMENTS

2020/0067812 A1    2/2020  Malhotra
2020/0204480 A1*   6/2020  Lo ......................... H04L 45/245

OTHER PUBLICATIONS

Sajassi et al., "Integrated Routing and Bridging in EVPN draft-ietf-bess-evpn-inter-subnet-forwarding-09", Jun. 14, 2020 (Year: 2020).*
Cisco, "VXLAN network with MP-BGP EVPN control plane" 2016 (Year: 2016).*
Jansen, David et al., VXLAN/EVPN Forwarding Characteristics, Published Oct. 3, 2017, by Cisco Press.

* cited by examiner

MULTIPLE NETWORK INTERFACING

RELATED APPLICATIONS

This application claims priority to U.S. Provisional Patent Application No. 63/039,825, filed on Jun. 16, 2020, the entire contents of which are incorporated herein by reference.

TECHNICAL FIELD

The present disclosure relates generally to computer networks, and more specifically to improving the accuracy and efficiency of forwarding traffic between devices supporting different networks, thereby improving network functionality and performance.

BACKGROUND

A network is a group of interconnected computing devices that can exchange data. An Ethernet Virtual Private Network (EVPN) may be used to extend and optimize remote Layer 2 (L2) and Layer 3 (L3) customer networks through an intermediate network. A network endpoint is a physical or virtual device connected to a computer network. An endpoint offers information, services, and applications to users or other nodes connected to the network. An endpoint is a node that is assigned a unique L2 network route, such as Media Access Control (MAC) route, and/or a unique L3 network route, such as an Internet Protocol (IP) route.

A tenant needing Integrated Routing and Bridging (IRB) services on a Provider Edge (PE) device requires an IP Virtual Routing and Forwarding (IP-VRF) table and a MAC Virtual Routing and Forwarding table (MAC-VRF). A MAC-VRF can have Bridge Tables (BTs) that are connected to an IP-VRF via an IRB interface. There are as many BTs as there are subnets, for a given tenant, and thus there are also as many IRB interfaces between the tenant IP-VRF and the associated BTs. IP-VRF is identified by its corresponding route target and route distinguisher and MAC-VRF is also identified by its corresponding route target and route distinguisher.

There are two models to accomplish inter-subnet forwarding with EVPN—asymmetric IRB and symmetric IRB modes. In symmetric IRB mode, the inter-subnet forwarding between two PE devices is done between their associated IP-VRFs. In asymmetric IRB mode, the inter-subnet forwarding between two PE devices is done between their MAC-VRFs and BTs. Different vendors use different modes and once a network is built using one mode, the other mode cannot be used in the same network. With symmetric IRB, all traffic egressing and returning from a VXLAN Tunnel Endpoint (VTEP) uses the same VNI and the bridge-route-route-bridge sequence offers flexibility for large-scale multitenant deployments. With respect to asymmetric IRB, there are differences concerning which VNI the IP packets travel through due to the differences between where and how the routing lookups are done. These differences cannot be reconciled unless the configuration is changed. Thus, it is advantageous for products to be placed in deployments that work with either of these modes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
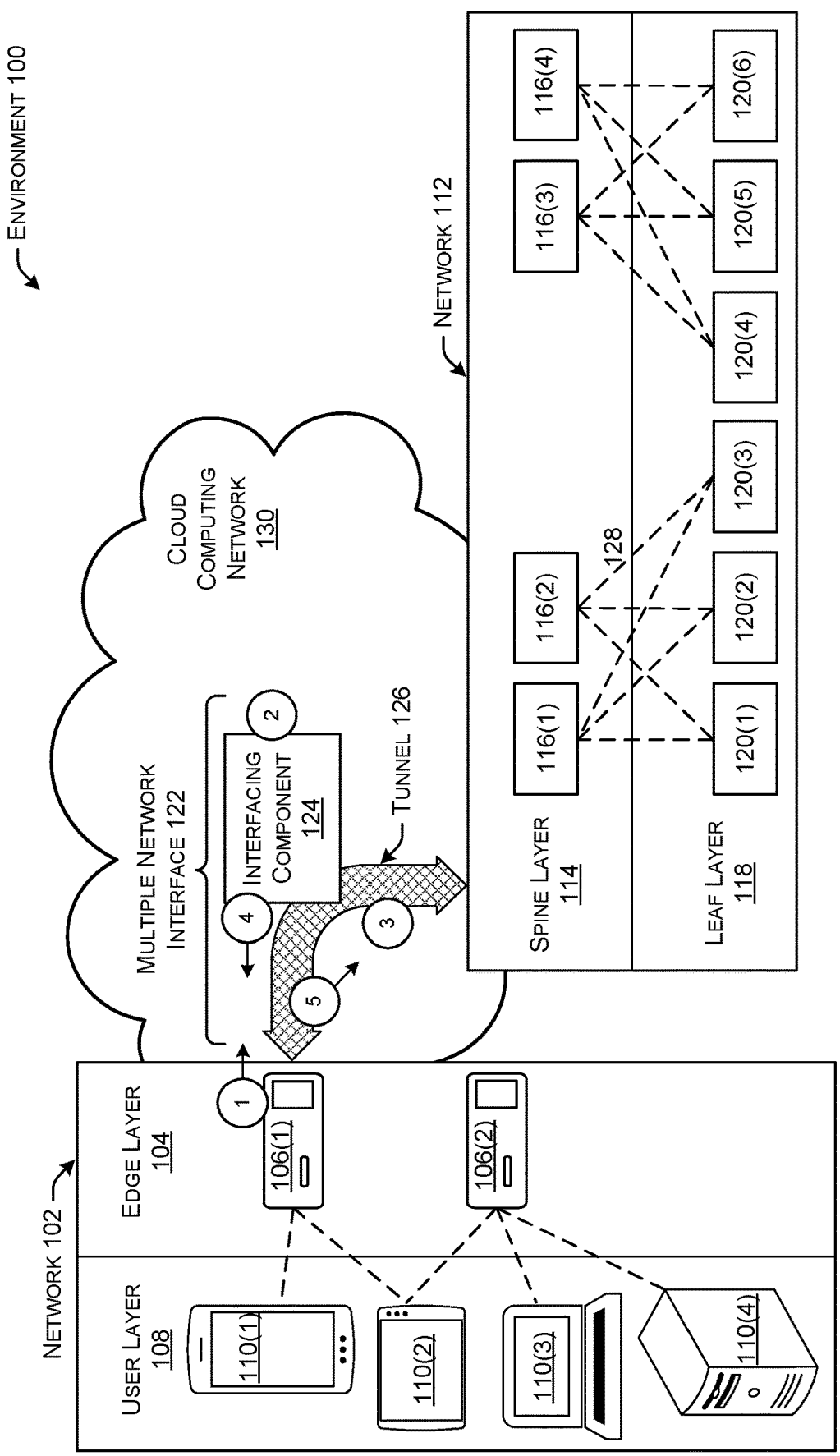
FIGS. 1-3C illustrate component diagrams with example environments in which multiple network interfacing techniques may be employed as part of communications between network devices, in accordance with the present concepts.

This disclosure describes, at least in part, a method that may be implemented by an interface component communicatively coupled to a first network and a second network. The method may include receiving, at the interfacing component, a first route advertisement from a first edge node in a Layer-2 (L2) fabric. The first route advertisement may indicate a first route to reach a first host in the L2 fabric. In some examples, the first route may be an asymmetric format route. The method may also include receiving, at the interfacing component, a second route advertisement from a second edge node in a L2/Layer-3 (L3) fabric. The second route advertisement may indicate a second route to reach a second host in the L2/L3 fabric. In some examples, the second edge node may be configured for symmetric integrated routing and bridging (IRB). The method may include re-originating the first route, to result in a first modified route. The interfacing component may be included as a hop in the first modified route to reach the first host in the L2 fabric. The method may also include re-originating the second route, to result in a second modified route. The interfacing component may be included as a hop in the second modified route to reach the second host in the L2/L3 fabric. Further, the method may include distributing the first modified route into the L2/L3 fabric and/or distributing the second modified route into the L2 fabric.

This disclosure also describes, at least in part, a method that may be implemented by an interface component communicatively coupled to a first network and a second network. The method may include receiving, at the interfacing component, a first route advertisement from a first edge node in a Layer-2 (L2) fabric. The first route advertisement may indicate a first route to reach a first host in the L2 fabric. In some examples, the first route may be an asymmetric format route. The method may also include receiving, at the interfacing component, a second route advertisement from a second edge node in a L2/Layer-3 (L3) fabric. The second route advertisement may indicate a second route to reach a second host in the L2/L3 fabric. In some examples, the second edge node may be configured for symmetric integrated routing and bridging (IRB). The method may include re-originating the first route, resulting in a first modified route that includes the interfacing component as a hop to reach the first host in the L2 fabric. The method may also include re-originating the second route, resulting in a second modified route that includes the interfacing component as a hop to reach the second host in the L2/L3 fabric. Further, the method may include receiving data traffic from the first edge node via the first modified route and forwarding the data traffic to the second edge node via the second modified route.

Additionally, the techniques described herein may be performed by a system and/or device having non-transitory computer-readable media storing computer-executable instructions that, when executed by one or more processors, performs the method described above.

Example Embodiments

This disclosure describes multiple network interfacing techniques for interfacing between different types of networks. Multiple network interfacing techniques may be used to enable interoperability between different types of networks. An example of different types of networks includes networks operating with different modes, such as asymmetric and symmetric Integrated Routing and Bridging (IRB) modes. For instance, multiple network interfacing techniques may include assistance with traffic routing between a first network (e.g., layer-2 only) that is able to produce asymmetric format routes and/or uses asymmetric centralized IRB, and a second network (e.g., layer 2/layer 3) that uses symmetric IRB and/or otherwise produces symmetric format routes. A multiple network interface may include one or more tunnels for routing traffic between two different networks. In some examples, the multiple network interface may include an interfacing component associated with the tunnel(s), such as a device enabled with a hybrid mode to interface and/or translate between the two different networks. As such, multiple network interfacing techniques may provide improved network operation and performance by allowing different types of networks to more easily route traffic and/or communicate.

A variety of architectures are contemplated that include a multiple network interface, such as an interfacing component and/or one or more tunnels consistent with multiple network interfacing concepts. For instance, in a multiple network interface the interfacing component may be manifest as one or more centralized gateways between multiple, segregated tunnels. In this instance, a centralized gateway may interface and/or translate between a first tunnel on a first network side, and a second tunnel on a second network side. The centralized gateway may be provisioned to perform a hybrid mode to interface and/or translate between the two different networks. In another instance, a multiple network interface may include a full mesh tunnel arranged between two different networks. In this instance, the interfacing component of the multiple network interface may be manifest as one or more devices of at least one of the networks, such as a spine switch(es). The spine switch(es) may be provisioned with a hybrid mode to interface and/or translate between the two different networks, for instance. A variety of examples are contemplated in which the multiple network interface is represented by one or more devices assisting the routing of traffic between different networks. The multiple network interface may be located within one or both of the different networks, outside of either network, and/or may be a system in communication with either or both of the networks. As such, the multiple network interface may include one or more tunnels, one or more centralized gateways, one or more spine switches, an SDN controller, a control-plane system, etc.

In some examples, a hybrid mode may include use of an ethernet virtual private network (EVPN). With an EVPN, an edge device, such as a provider edge (PE) device, may function with a hybrid IRB mode that includes forwarding traffic between networks using asymmetric and symmetric IRB modes. In this example, the hybrid PE device may be viewed as the interfacing component. For example, the hybrid PE device may receive a symmetric formatted route from a symmetric IRB PE (e.g., a node in a network operating with a symmetric mode). The hybrid PE device may be configured to process the EVPN Route Type 2's (MAC/IP Advertisement Route) as follows: Media Access Control (MAC) portion into the MAC-VRF and its respective Bridge-Table (BT) and Internet Protocol (IP) portion into the IP-VRF and the respective routing table. When an asymmetric formatted route is received from an asymmetric IRB PE (e.g., anode in a different network operating with an asymmetric mode), the hybrid PE device is configured to process the MAC/IP Advertisement Route as follows: MAC portion into the MAC-VRF and its respective BT and MAC plus IP portion combined installed in the local ARP table pointing to the asymmetric IRB PE. As a result, the receiving PE device (a node in either the symmetric-mode or asymmetric-mode network) may direct inter-subnet traffic forwarding based upon the received advertisement. Thus, the hybrid PE device may facilitate interoperability between networks with symmetric IRB and networks with asymmetric IRB. Note that these techniques may be accomplished with no change to the control plane or configuration of the IRB nodes.

Although the examples described herein may refer to a network device (e.g., PE device, gateway device, centralized gateway device, switch) as the point of generation of multiple network interfacing techniques, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present multiple network interfacing concepts. Example environment 100 may include a first network 102. Network 102 may include an edge layer 104 with edge nodes 106 (e.g., switches, provider edges (PE), L2-PEs, routers, etc.) and a user layer 108 with user devices 110 (e.g., hosts), for instance. Example environment 100 may also include a second network 112. Network 112 may include a spine layer 114 with spine nodes 116 (e.g., switches, edge nodes, PEs, L2/L3-PEs, routers, etc.) and a leaf layer 118 with leaf nodes 120 (e.g., hosts). Example environment 100 may include a multiple network interface 122. In some examples, multiple network interface 122 may include an interfacing component 124 (e.g., networking device) and/or one or more tunnels 126. In FIG. 1, the use of parentheticals after a reference number is intended to distinguish like elements. Use of the reference number without the associated parenthetical is generic to the element. For instance, four user devices 110 are depicted in FIG. 1, including user device 110(1), user device 110(2), user device 110(3), and user device 110(4).

Devices of environment 100, including edge nodes 106, user devices 110, spine nodes 116, leaf nodes 120, and/or interfacing component 124 may be communicatively coupled to various other devices of environment 100 via network connection(s). Some of the network connections in environment 100 are depicted with dashed lines 128 (only one dashed line is specifically designated, between spine node 116(2) and leaf node 120(3)). Note that individual network connection(s) between edge layer 104, interfacing component 124, and/or spine layer 114 are not depicted to avoid clutter on the drawing page. At least some of the network connections may be viewed as elements of a cloud computing network 130, in some cases. The network connections may be transport control protocol (TCP) network connections or any network connection (e.g., information-centric networking (ICN)) that enables device of environment 100 to exchange one or more packets with other devices of environment 100. The network connections represent, for example, data paths between the devices of environment 100. It should be appreciated that the term "network connection" may also be referred to as a "network path." The use of a cloud computing network in this example is not meant to be limiting. Other types of networks are contemplated in accordance with multiple network interfacing concepts.

FIG. 1 may be viewed as illustrating an example multiple network interfacing scenario in which network 102 and network 112 are different types of networks. For example, network 102 may be a college campus operating as a layer-2 (L2)-only network, while network 112 may be a data center in the cloud, operating as layer-2/layer-3 (L2/L3) network using symmetric IRB. As shown in FIG. 1, user device 110(1), user device 110(2), user device 110(3), and user device 110(4) are depicted as a mobile phone, tablet-type device, laptop, and desktop computer, respectively. The depiction of any particular type of device is for illustration purposes only and is not meant to be limiting; a wide variety of devices are contemplated as a user device 110. Edges nodes 106, spine nodes 116, and/or leaf nodes may comprise any type of networked device, such as a server, switch, router, hub, bridge, gateway, modem, repeater, access point, host, or other type of computing device.

FIG. 1 shows several examples of communications among the devices of environment 100, indicated with circled numbers. The communications may be viewed as steps in the example multiple network interfacing scenario illustrated by FIG. 1. For example, at "Step 1," interfacing component 124 may receive a communication from an edge node 106(1) of network 102. Since network 102 is L2-only in this scenario, edge node 106(1) may send traffic via cloud computing network 130 with asymmetrical formatting. For instance, edge nodes 106 may be considered L2 bridging nodes. Edge nodes 106 may be enabled with address resolution protocol (ARP) and/or network discovery (ND) suppression. As such, routes associated with edge nodes 106 may be end point MAC+IP routes that are formatted as asymmetric IRB routes, which may be received by interfacing component 124, a centralized IRB node (e.g., interworking node), in this scenario. Stated another way, routes to reach a device network 102 may be formatted asymmetrically, in this scenario. Therefore, the communication received at interfacing component 124 may include an asymmetric IRB route.

At "Step 2," interfacing component 124 may determine a device in network 112 with which the user device 110 wishes to communicate. For illustration purposes, consider that user device 110(1) intends to reach leaf node 120(2). Interfacing component 124 may translate the asymmetric IRB route into a symmetric format route that is able to be received by leaf node 120(2), a symmetric IRB device in this scenario.

At "Step 3," a tunnel 126 may be arranged to help route traffic from user device 110(1) to leaf node 120(2). In some examples, interfacing component 124 may generate at least one tunnel 126.

At "Step 4," interfacing component 124 may communicate with edge node 106(1) to provide the symmetric route.

At "Step 5," data traffic may be sent from user device 110(1) to network 112, intended for leaf node 120(2). For instance, the data traffic may be sent using tunnel 126.

Figure 2:
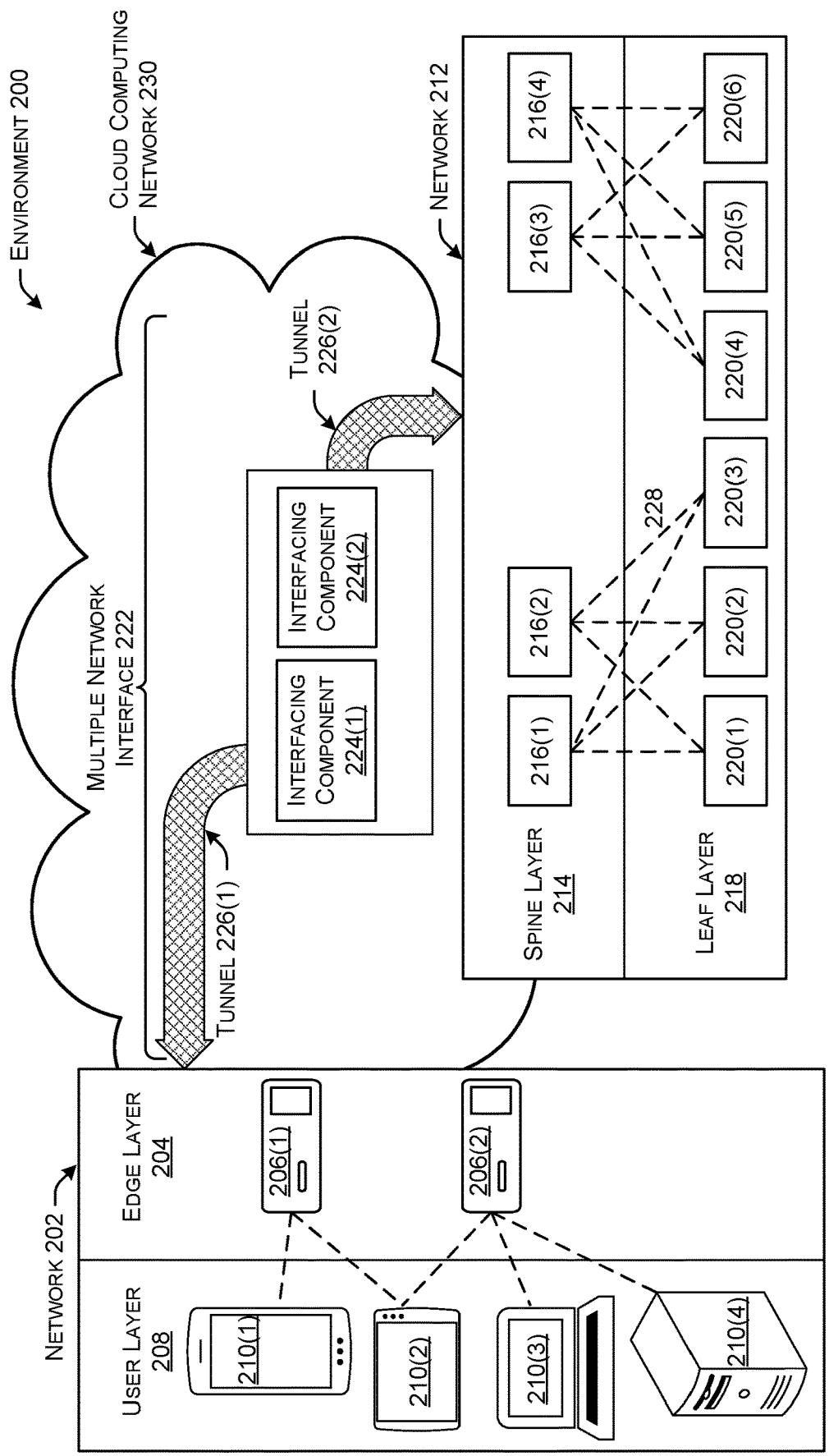
Figure 3A:
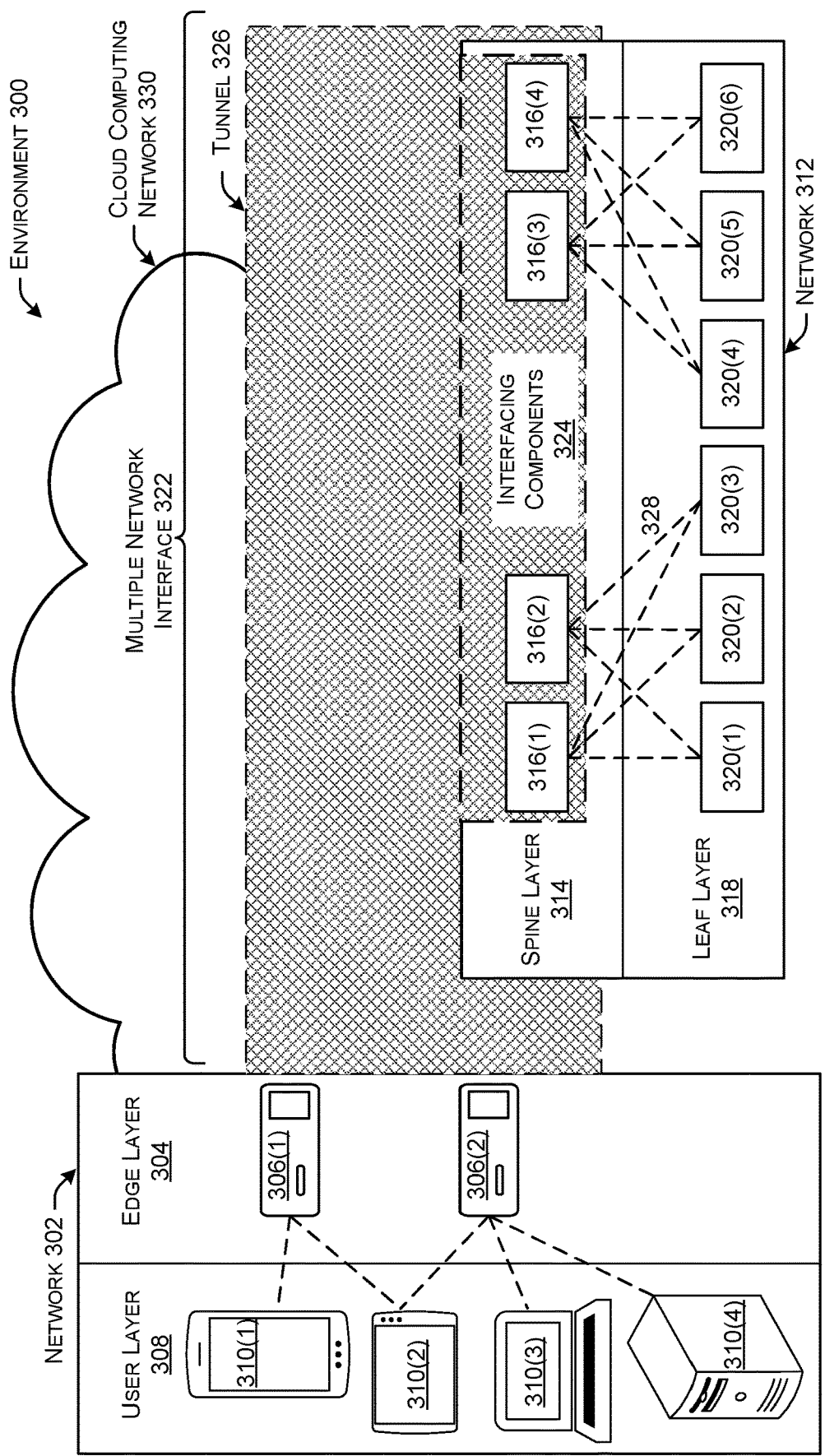
Figure 3B:
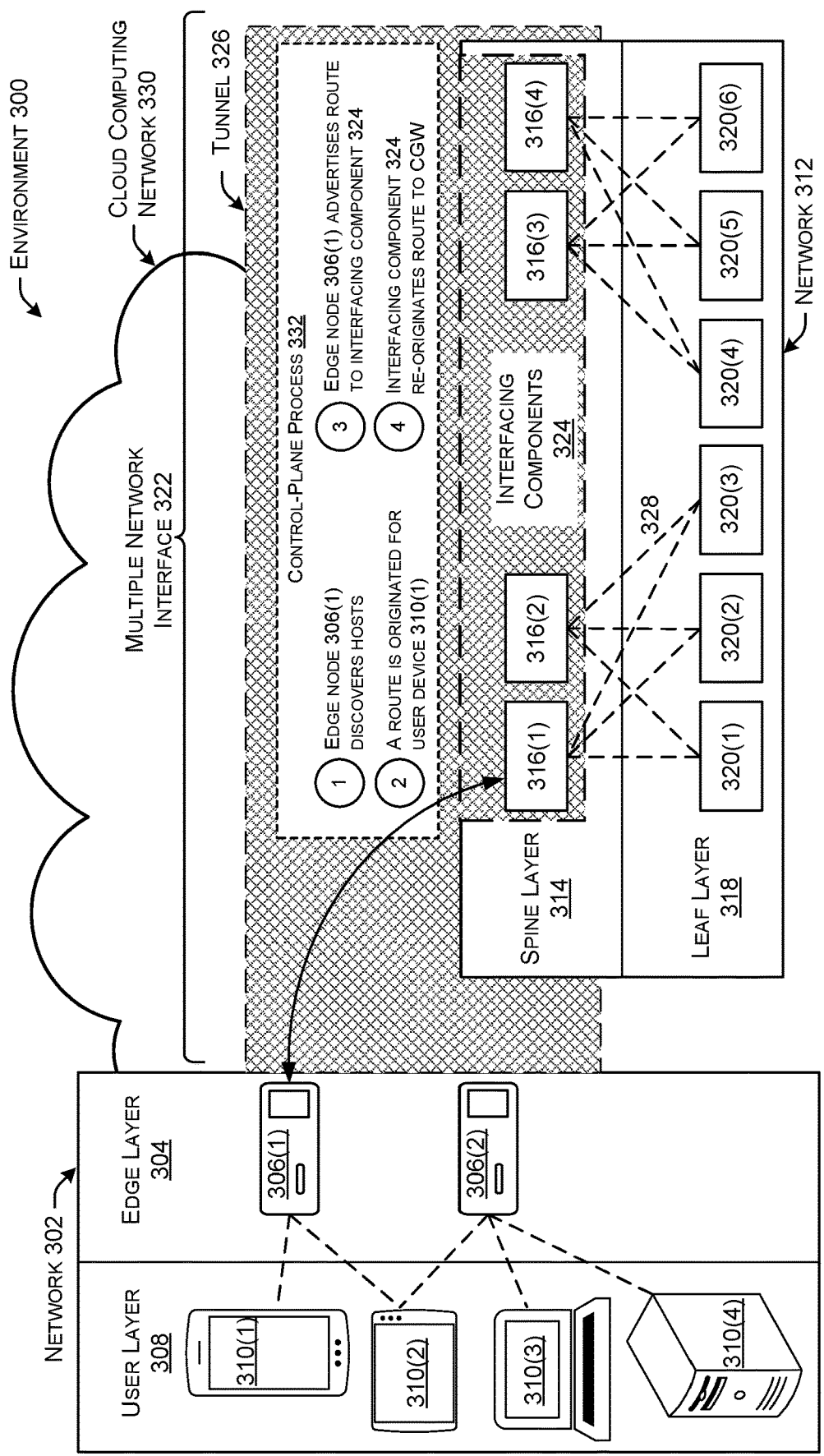
Figure 3C:
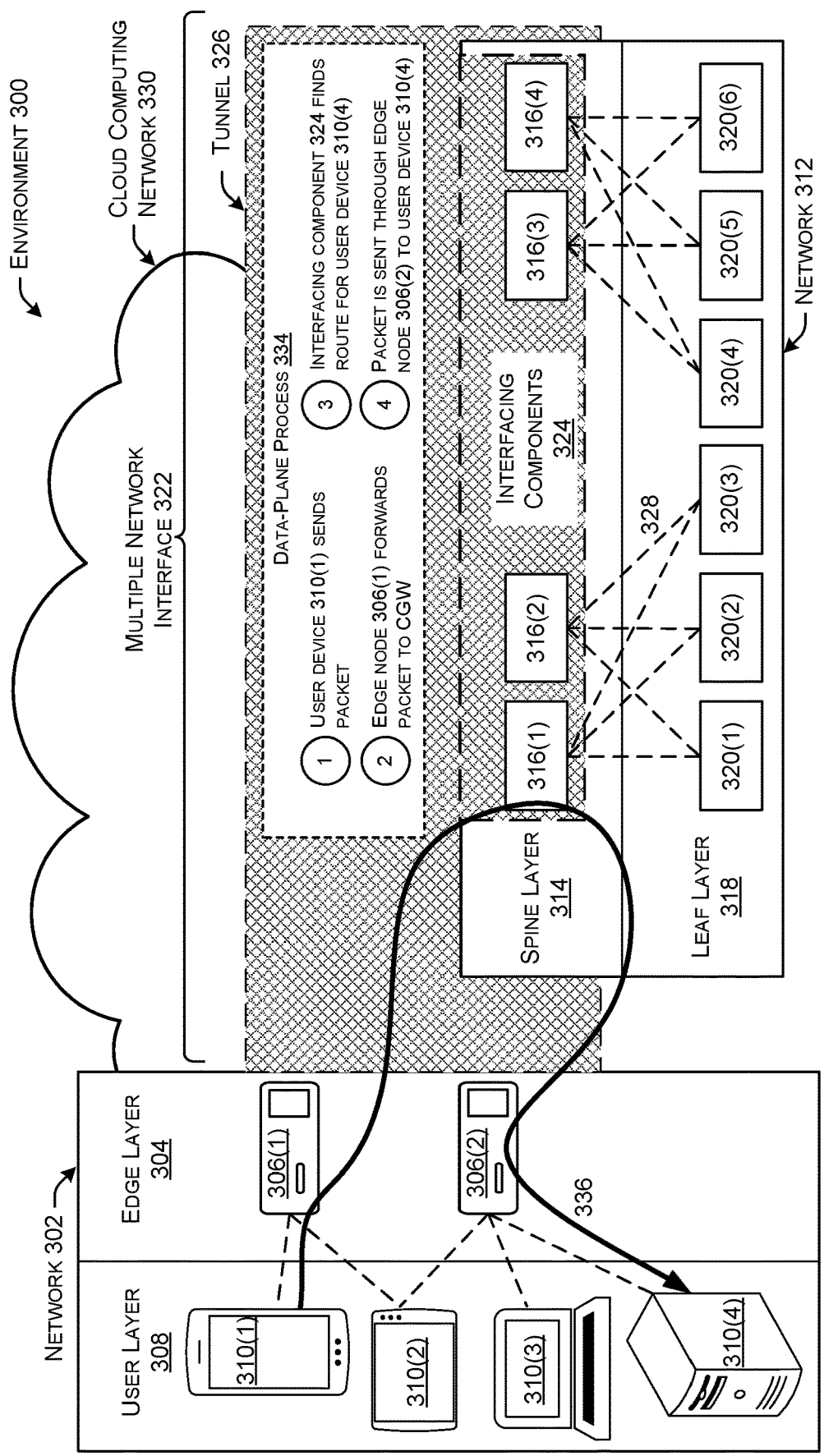

FIGS. 2-3C collectively illustrate additional example scenarios in accordance with the present multiple network interfacing concepts. FIG. 2 illustrates an example environment 200, while FIGS. 3A-3C illustrate an example environment 300. Some aspects of the examples shown in FIGS. 2-3C may be similar to aspects of the examples described above relative to FIG. 1. Therefore, for sake of brevity, not all elements of FIGS. 2-3C will be described in detail.

FIG. 2 illustrates an example environment 200 in which a multiple network interface 222 includes interfacing components 224 and tunnels 226. In this example, the tunnels 226 may be viewed as segregated tunnels that have an interfacing component 224 as an endpoint. For instance, tunnel 226(1) may connect edge layer 204 with interfacing component 224(1), while tunnel 226(2) connects interfacing component 224(1) with leaf layer 218. The particular number or arrangement of tunnels 226 or interfacing components 224 shown in FIG. 2 is not meant to be limiting.

In the example depicted in FIG. 2, the interfacing components 224 may be viewed as interworking gateways between network 202 and network 212. Also, an interfacing component 224 may be viewed as a centralized first-hop routing gateway (CGW) for user layer 208. As such, tunnels 226s may be viewed as pathways for data to travel between the network 202 and network 212. Note that at least some of the spine nodes 216 of network 212 may function as interfacing components 224, in some examples. More detail regarding data traffic, including routing, control plane, and data plane functions, will be discussion relative to FIGS. 3B and 3C below.

FIG. 3A illustrates an example environment 300 in which a multiple network interface 322 includes a tunnel 326. In this example, the tunnel 326 may be considered a full mesh tunnel between components of network 302 and components of network 312.

FIGS. 3B and 3C depict an example control plane process 332 and an example data plane process 334, respectively. The example control plane process 332 and example data plane process 334 are shown relative to the example environment 300, including example multiple network interface 322, with the full mesh tunnel 326. However, at least some of the control plane and data plane multiple network interfacing concepts described relative to multiple network interface 322 may also be generally applied to the multiple network interface 222 of FIG. 2. Therefore, the discussion below will include description of how the control plane and data plane processes and/or other multiple network interfacing concepts may be applied in both example environments (FIG. 2 and/or FIG. 3A).

FIG. 3B depicts an example scenario in which elements of a multiple network interface 322 may perform a control plane process 332 consistent with multiple network interfacing concepts. In this example scenario, a user device 310(1) in network 302 may be interested in accessing a service at a leaf node 320(1) in network 312, for instance. However, the edge nodes 306 of network 302 may be configured as L2-only nodes, while the leaf nodes 318 of network 312 may be configured for symmetric (IRB). Therefore, in some examples, multiple network interface 322 may assist with interoperability between network 302 and network 212, as described below.

At "Step 1" of FIG. 3B, edge node 306(1) of network 302 may perform a variety of operations to learn about user devices 310 or other computing devices in network 302. For instance, edge nodes 306 of network 302 may receive messages from user devices 310, perform discovery of devices (such as address resolution protocol (ARP) snooping), etc. Thus, edge node 306(1) may learn the addresses of user devices 310 and or other computing devices. Stated another way, edge node 306(1) may represent an L2-PE switch that performs ARP snooping to figure out what hosts (e.g., user devices 310) are behind it, relative to cloud computing network 330.

At "Step 2" of FIG. 3B, a route may be originated for user device 310(1). For instance, an asymmetric format route may be originated for user device 310(1), since user device 310(1) is part of network 302, an L2-only network.

At "Step 3" of FIG. 3B, edge node 306(1) may advertise the route for user device 310(1) to an interfacing component 324. For example, edge node 306(1) may advertise the route for user device 310(1) to spine node 316(1), which may be functioning as an interfacing component 324 of multiple network interface 322.

At "Step 4" of FIG. 3B, spine node 316(1), acting as an interfacing component 324, may re-originate the route from user device 310(1) to leaf node 320(1). The re-origination of the route may include resetting the route such that spine node 316(1) is a hop and/or termination point for the route. Further, any route from a device of network 302 may be routed to an interfacing component 324, rather than to an edge node 306 (e.g., L2-PE switch). Thus, spine node 316(1) acts as an interworking gateway between network 302 and network 312. Spine node 316(1) may also act as a centralized first-hop router for end points connected to an L2 fabric, therefore a centralized gateway (CGW). In this manner, any interfacing component 324 may provide interoperability between network 302 and network 312.

In some examples, interfacing component(s) 324 may perform similar functions to control plane process 332 for network 312. For instance, the spine nodes 316 may receive routes and/or re-originate routes from leaf nodes 320, making the interfacing component(s) 324 the end point of any particular route. Stated another way, the CGW (e.g., interfacing component 324) may re-originate routes for switches (e.g., spine nodes 316) and/or hosts (e.g., leaf nodes 320) in the data center L2/L3 fabric, setting the CGW as the termination point for all routes.

A result of control plane process 332 may be that routes from devices in network 302 and network 312 are re-originated with a CGW as a termination point. The re-originated routes may then be distributed to appropriate devices in network 302 and/or network 312. Thus data traffic may pass through the CGW(s), or interfacing component(s) 324.

FIG. 3C depicts an example scenario in which elements of a multiple network interface 322 may perform a data plane process 334 consistent with multiple network interfacing concepts. In this example scenario, user device 310(1) may be interested in accessing a printer at user device 310(4), for instance. Inter-subnet routing between end-points within network 302 may use the CGW function of interfacing component 324. In some examples, the CGW function may be enabled via interfacing component 324 learning routes from edge node 306(1) and edge node 306(2).

At "Step 1" of FIG. 3C, user device 310(1) may send a packet to edge node 306(1).

At "Step 2" of FIG. 3C, edge node 306(1) may forward the packet to spine node 316(1), which is the CGW in this instance.

At "Step 3" of FIG. 3C, spine node 316(1) is acting as an interfacing component 324. As an interfacing component 324, spine node 316(1) may look up and/or find a route for user device 310(4).

At "Step 4" of FIG. 3C, spine node 316(1), as the interfacing component 324, may forward the packet from user device 310(1) to user device 310(4) via edge node 306(2), using the route for user device 310(4).

In some implementations, aspects of the control plane process 332 (FIG. 3B) and/or the data plane process 334 (FIG. 3C) described relative to example environment 300 may be applied to example environment 200 (FIG. 2). For instance, interfacing components 224 may receive advertised routes from devices of network 202 and/or network 212, such as user devices 210 and/or leaf nodes 220. Interfacing components 224 may re-originate routes from the devices of network 202 and/or network 212 to interfacing components 224. Interfacing components 224 may serve as CGWs for environment 200. Subsequently, interfacing components 224 may receive and route traffic to an appropriate destination, using the re-originated routes for inter-network traffic where applicable.

The following discussion provides additional detail and highlights potential advantages regarding the example architectures shown in FIGS. 1-3A and the related control plane and data plane processes shown in FIGS. 3B and 3C.

Referring to FIG. 2, in some implementations, where the CGW is a L2/L3-PE switch (e.g., spine node 216), the CGW may operate as a hybrid between different types of PEs. For instance, the CGW may have the ability to participate in the IP VRFs. Since the CGW is a hybrid of symmetric and asymmetric IRB, the CGW may provide First-Hop Gateway function to L2-PEs (e.g., edge nodes 206). The CGW may allow interaction with other L2/L3-PEs with Symmetric IRB and bridge as necessary and route where possible. Note that the Hybrid IRB function may only be needed on the CGW cluster member.

In some examples, ARP suppression may be used for Anycast CGW IP. In order to avoid multiple ARP responses from Anycast CGW PEs, Anycast GW IP/MAC may be advertised using RT-2 to all L2 PEs. For example, L2 PEs may use the received GW RT-2 to populate a local ARP suppression cache for the GW ARP entry. Any ARP request for the GW IP may then be locally processed on the L2 PEs, instead of being flooded to CGW PEs. Thus, a problem of multiple ARP responses may be reduced or potentially eliminated.

In addition to performing first hop routing for hosts behind L2 PEs, Anycast-CGW for a given EVI may also be used both as an L2 GW and as an L3 GW between L2 PEs in an L2 only fabric (e.g., network 202) and/or L2/L3 PEs in a Symmetric IRB fabric (e.g., network 212). This may enable interoperability (inter-op) between a Symmetric IRB fabric and an L2-only fabric. For instance, hub-and-spoke tunnels may be established between the CGW hub and L2 PE, with L2/L3 PE spokes for both routed and bridged traffic across the two fabrics. Such an arrangement may result in a variety of advantages, such as potentially optimized tunnel adjacency scale (as opposed to a full tunnel mesh between L2 PEs and L2/L3 PEs), and/or consistent data paths (L2/L3 tunnels) for routed and bridged traffic between L2 fabric and Symmetric IRB fabric hosts.

With continuing reference to FIG. 2, in order to achieve consistent data path for routed and bridged traffic across the two fabrics and address tunnel scalability concerns, one or more of the following tunnel adjacency rules may apply: Layer-2 only PEs (L2-PE) may initiate L2 tunnel adjacency with other L2-PEs; L2-PEs may initiate an L2 tunnel adjacency to the CGWs that host respective EVIs; existing PEs with Symmetric IRB (L2/L3 PE) may initiate L2 and L3 tunnel adjacencies with the CGWs and with other L2/L3 PEs that host the respective IP VRF and EVI; Layer-3 only PEs may initiate L3 tunnel adjacencies with the CGW and with other L2/L3 PEs that host the respective IP VRF. As a result of this ruleset and through the re-origination at the CGW, logical separation may be provided across Layer-2 domains. As a result, larger segregated tunnel domains may be created, as opposed to a full mesh of tunnels across domains.

In some examples, MAC/IP bindings learnt from L2 PEs may be re-originated by CGW members as L2+L3 symmetric host routes towards L2/L3 PEs and/or L3-only PEs, with CGW as the tunnel next-hop. Further, L2+L3 symmetric host routes learnt from L2/L3 PEs may be re-originated towards L2 PEs with CGW as the tunnel next-hop. As such, stripping off the L3 label and RTs (when re-originated towards L2 PEs) may not be required, since these elements may be ignored by L2 PEs. Control plane re-origination, together with the above overlay tunnels, may enable seamless interworking with Symmetric IRB. For instance, re-origination may provide full L2 and L3 multi-tenancy support across the entire overlay, and a consistent and optimal data path for both routed and bridged towards a PE that has a host attached. In some examples, for centrally routed hosts, MAC lookup post First-Hop IP routing may be provided. For distributed routed hosts, MAC lookup post First-Hop IP routing may not be needed.

Anycast CGW MAC/IP routes may be advertised by the CGW PE with a "default GW" extended community, as per RFC 7432. A similar function may be performed at L2 PEs for the purpose of ARP suppression and GW MAC forwarding entry as per non-GW handling procedures in RFC 7432. A few additional considerations with respect to CGW MAC/IP route handling at the L2 PE will now be described. A remote GW MAC/IP route may be treated as static, and EVPN mobility procedures may not be applied to local learning at L2 PE. This practice may prevent a locally learnt duplicate MAC/IP from taking precedence over the remote GW MAC/IP at an L2 PE. Using regular mobility and duplicate detection procedures in this case may result in the duplicate host MAC/IP permanently taking precedence over GW MAC/IP at the L2 PEs, depending on the order. In another example consideration, CGW originating the GW MAC/IP route may follow the a substantially similar sequence number assignment logic for GW MAC as any other host MAC. For example, if there is a prior remote MAC learnt via BGP, GW MAC/IP may be advertised with a higher sequence number. This practice may help ensure that L2 PE BGP best path logic may pick the GW RT-2 as (potentially) best, and install in MAC-VRF/L2RIB, if there is a prior local duplicate, for instance. In another example consideration, L2RIB producer-based best route selection may be augmented to give preference to a BGP produced "Default GW" attribute over a locally learnt route, independent of the sequence number. This is to ensure that the GW MAC/IP RT-2 will be preferred at L2 PE and installed in MAC-VRF and ARP suppression, when there is a prior non-GW MAC/IP. In yet another example consideration, a duplicate non-GW MAC/IP (in the presence of a GW MAC-IP) may be reported via syslog.

Separate split-horizon groups may be used at the CGW for L2 PE domain and L2/L3 PE domain for BUM traffic flooding. In case of multiple PE members in an Anycast CGW cluster, Anycast VTEP OR DF-election approach may be used to ensure that BUM packets in one split-horizon are only flooded by one of the CGWs towards the other split-horizon. For instance, in case of an anycast VTEP, BUM traffic may be received and forwarded by only one of the anycast VTEPs. In case of DF election, BUM traffic may be received by all of the VTEPs, but potentially only forwarded by the elected DF. An Anycast VTEP approach may only be applicable to VXLAN, and not to MPLS, for instance. Identification of L2 PE(s) and L2/L3 PE(s) to facilitate placement in separate split-horizons may be achieved via configuration or via separate BGP sessions, in some cases.

In some examples, MAC/IP binding information known in EVPN may be imported by potentially all Anycast GW PEs. As a result, a consistent MAC/IP binding state on PE members may exist. Thus, in the case of reload events, traffic black-holing may be prevented.

In some implementations, CGW PE function for an EVI may also be co-located on one or more L2/L3 PEs (Symmetric IRB Distributed Gateways) that may function as the CGW cluster. In this case, a CGW on a L2/L3 PE may function as a control plane re-origination and data plane tunnel stitching point, following tunnel adjacency and split-horizon rules listed above. This arrangement is essentially a CGW as described above, with local ports and/or hosts attached to an EVI. Local hosts may be advertised to both L2 PEs and L2/L3 PEs. Since a locally attached host route may be re-originated to L2 PEs by another CGW in the cluster, a BGP local preference attribute may be used to ensure that the locally originated CGW path is preferred over a re-originated path at the L2 PE, to result in a (potentially) optimal data path.

Referring to FIG. 3, in some implementations, multiple network interfacing concepts may include enabling a first hop redundancy (FHR) service for L2-only fabric (e.g., network 302) hosts (e.g., user devices 310) and/or a routed/ bridged inter-op with a multi-tenant Symmetric IRB fabric (e.g., network 312). This example may serve use cases that prefer a layer 2 overlay extension across both layer-2 and Symmetric IRB fabrics. The FHR service may be accomplished by loading (e.g., overloading) the Symmetric IRB distributed any-cast GW cluster to also operate as an any-cast FHR and/or Centralized GW cluster for layer-2 only fabric hosts. This functionality may be accomplished without setting up a new FHR PE for L2 fabric hosts, in some cases. This solution may also provide flexibility with respect to which PE nodes may be used for first-hop routing, and maintaining full L2/L3 multi-tenancy support. In some examples, usage of default GW advertisement may be extended, and may be used in conjunction with hybrid PE functions on Symmetric IRB PEs (e.g., spine nodes 316) to build a centralized GW solution with Symmetric IRB interop. The example architecture depicted in FIG. 3A may feature a full mesh of L2 tunnel adjacencies across IRB PEs and L2 PEs for a given EVI, as well as a full mesh of L3 tunnel adjacencies across IRB PEs and L3 only PEs for a given IP VRF.

In some examples, a Symmetric IRB Distributed Anycast Gateway cluster that is comprised of Symmetric IRB PEs that locally host an EVI may be extended to also be used as a Centralized GW cluster for layer-2 only fabric (e.g., network 302). The EVPN-IRB PEs for a given EVI may be configured in an additional anycast-centralized-gateway mode for that EVI. This mode on EVPN-IRB PEs may result in the following features. Distributed Anycast GW MAC/IP binding may be advertised to all L2 PEs with the default GW extended community. MAC/IP bindings may be received from EVPN L2 PEs to be installed in a local ARP or layer-3 adjacency table. MAC/IP bindings received from EVPN L2 PEs may be installed as attached host routes in IP VRF. MAC received from L2 PEs may be installed in MAC VRF. Handling of MAC/IP bindings from other EVPN-IRB PEs may be as per symmetric IRB.

On L2 PEs, the received GW MAC/IP may enable the L2 PEs to be able to service GW ARP requests locally via a ARP suppression function, as well as bridge FHR packets from hosts to ONE of the EVPN-IRB PEs in the centralized GW cluster. As an extension of an ARP suppression function, L2 PEs may also send periodic probes to refresh local ARP suppression cache entries. GW MAC/IP received from IRB PEs may be used as the source for these probes. On EVPN-IRB PEs, such an arrangement essentially enables asymmetric IRB functioning for hosts learnt from L2 PEs.

In some implementations, leveraging IRB PEs as CGW cluster members enables options with respect to load-balancing and/or load-sharing FHR function across the CG cluster members. Since all cluster members advertise GW MAC/IP, L2 PEs receive GW MAC paths from all CG cluster members. L2 PEs may use these received paths as GW MAC ECMP paths in the data-plane, and/or may load-share across these paths in control plane by appropriately hashing across the paths to pick one of the paths to be installed in the data plane. The hashing may be based on an EVI function to spread the FHR functions across CG cluster members for different EVIs, such that GW MAC in each MACVRF context hashes to a different IRB PE, for instance. This practice may result in both CG member failure resiliency and load-sharing. Additionally or alternatively, a combination approach of load-balancing and load-sharing may be performed by selecting (e.g., via EVI hash) at least two GW MAC next-hops to be installed in the data plane. This practice may result in load-balancing and/or faster convergence.

In an instance where a use case benefits from a FHR function localized on a subset of EVPN-IRB PEs for a given EVI (as opposed to enabled on all IRB PEs, for instance), specific IRB PEs may be configured to not advertise the GW MAC/IP to L2 PEs. These non-CG PEs may still operate with asymmetric IRB capability and import MAC/IP bindings from L2 PEs as specified above, but may not advertise themselves as a GW, and hence may not attract any FHR traffic destined to GW MAC.

In some examples, usage of a default GW extended community as defined in RFC 7432 section 10.1 may hence be extended for the purpose of FHR localization to specific Symmetric IRB PEs, as well as for L2 PEs for the purpose of generating refresh probes for ARP snooping learnt entries. The ARP snooping learnt entries may be advertised to L2 and L2/L3 PEs for ARP suppression and for routing respectively. An L2 PE may use GW MAC/IP as the source to send an ARP probe towards an ARP snooping-learnt locally attached host.

Handling of MAC/IP routes received from L2 PEs and IRB-PEs at a CG member may be done on individual route basis, depending on L3 attributes being present or absent in the route, for instance. However, flaps and configuration changes on PEs may cause transient route advertisements without L3 attributes. This may result in heavy churn and/or handling complexity on the CG PE. In some instances, deriving this property in a more static manner such as BGP session separation may be preferred to avoid this churn.

To summarize, the multiple network interfacing techniques described herein may improve network performance by offering interoperability between L2 fabric and Symmetric IRB fabric. The example architecture shown in FIG. 2 may help optimize tunnel scale using a stitching and/or re-origination approach at a Centralized GW cluster. The example architecture shown in FIG. 3A may include a full mesh of tunnels across multiple different networks, without designating PEs to act as stitching and/or re-origination points. Furthermore, the multiple network interfacing techniques may be relatively lightweight, featuring low computational cost and/or low bandwidth usage.

Figure 4:
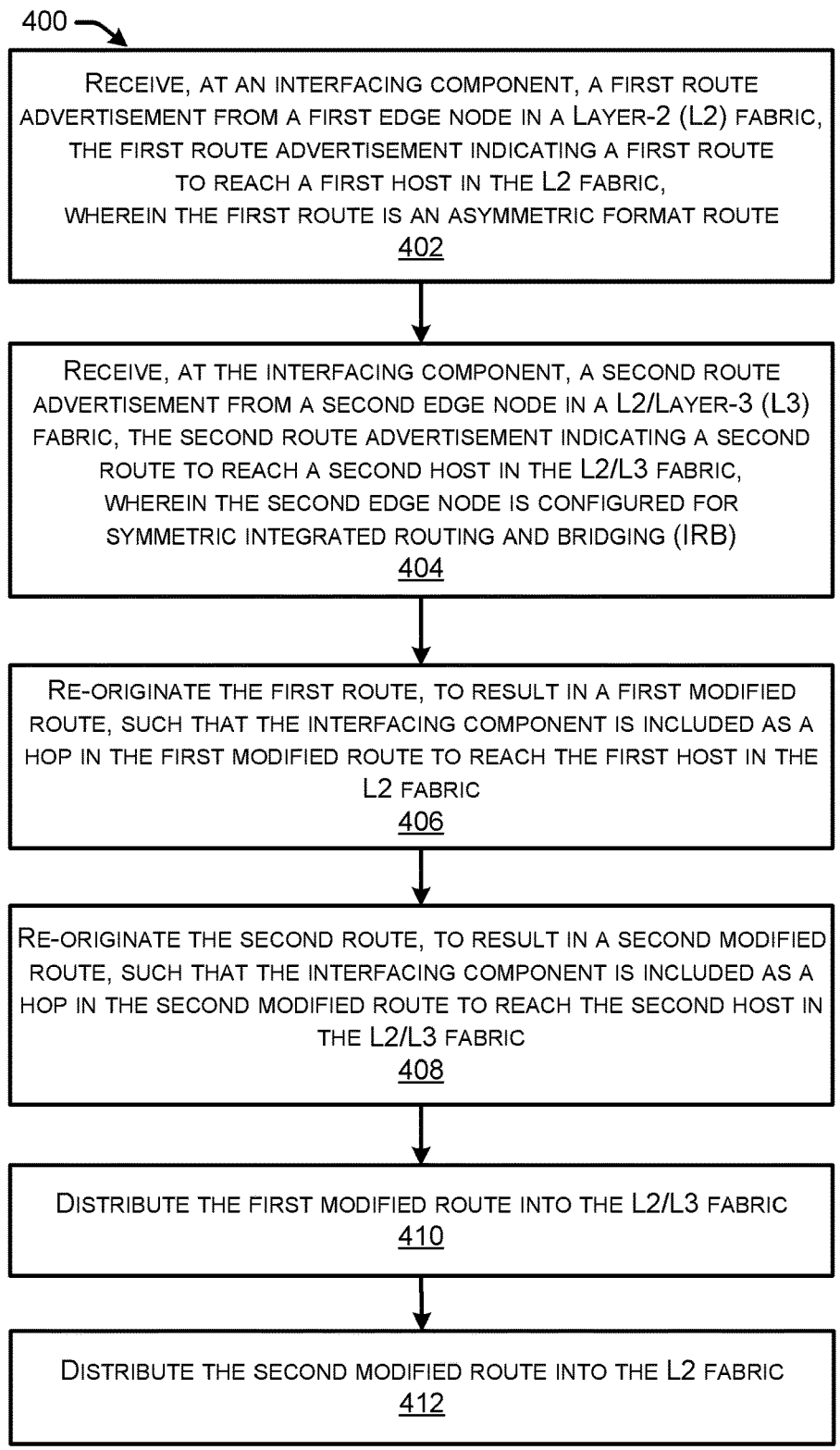
FIGS. 4 and 5 illustrate flow diagrams of example multiple network interfacing methods as a part of communications among network devices, in accordance with the present concepts.
Figure 5:
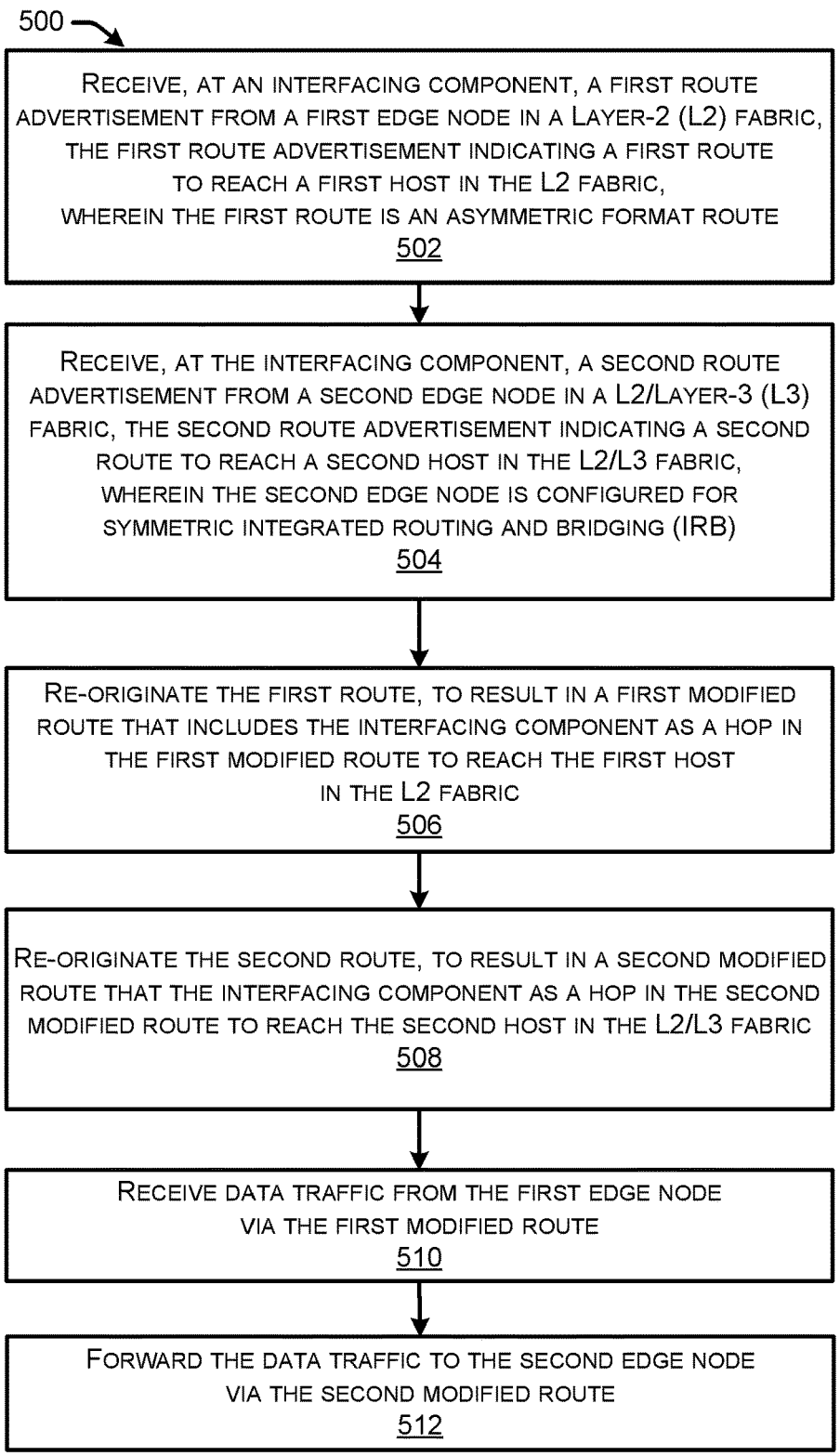

FIGS. 4 and 5 illustrate flow diagrams of example methods 400 and 500 that include functions that may be performed at least partly by interfacing component, such as interfacing component 124 described relative to FIGS. 1-3C. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 4 and 5 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 4 illustrates a flow diagram of an example method 400 for network devices to perform multiple network interfacing techniques. Method 400 may be performed by an interfacing component (e.g., interfacing component 124) communicatively coupled to one or more network devices (e.g., edge node 106, spine node 116), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving, at the interfacing component, a first route advertisement from a first edge node in a Layer-2 (L2) fabric. The first route advertisement may indicate a first route to reach a first host in the L2 fabric. In some examples, the first route may be an asymmetric format route. In some implementations, the interfacing component may be manifest as an element of the L2/L3 fabric. In some implementations, the interfacing component may comprise a CGW for data traffic routed between and/or among elements of the L2 fabric and the L2/L3 fabric.

At 404, method 400 may include receiving, at the interfacing component, a second route advertisement from a second edge node in a L2/Layer-3 (L3) fabric. The second route advertisement may indicate a second route to reach a second host in the L2/L3 fabric. In some examples, the second edge node may be configured for symmetric integrated routing and bridging (IRB).

At 406, method 400 may include re-originating the first route, to result in a first modified route. The interfacing component may be included as a hop in the first modified route to reach the first host in the L2 fabric.

At 408, method 400 may include re-originating the second route, to result in a second modified route. The interfacing component may be included as a hop in the second modified route to reach the second host in the L2/L3 fabric.

At 410, method 400 may include distributing the first modified route into the L2/L3 fabric. At 412, method 400 may include distributing the second modified route into the L2 fabric. In some examples, method 400 may further include receiving, at the interfacing component, data traffic from the first edge node via the first modified route. Method 400 may include determining, at the interfacing component, that the data traffic is intended for the second host. Based at least in part on determining that the data traffic is intended for the second host, method 400 may include forwarding, at the interfacing component, the data traffic to the second host via the second modified route.

In some examples, method 400 may further include receiving, at the interfacing component, data traffic from the first edge node via the first modified route. Method 400 may include determining, at the interfacing component, that the data traffic is intended for a third host in the L2 fabric. Method 400 may also include receiving, at the interfacing component, a third route advertisement from a third edge node in the L2 fabric. The third route advertisement may indicate a third route to reach a third host in the L2 fabric. Method 400 may include re-originating, at the interfacing component, the third route, to result in a third modified route, such that the interfacing component is included as a hop in the third modified route to reach the third host in the L2 fabric. Based at least in part on determining that the data traffic is intended for the third host, method 400 may include forwarding, at the interfacing component, the data traffic to the third host via the third modified route.

FIG. 5 illustrates a flow diagram of an example method 500 for network devices to perform multiple network interfacing techniques. Method 500 may be performed by an interfacing component (e.g., interfacing component 124) communicatively coupled to one or more network devices (e.g., edge node 106, spine node 116), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include receiving, at the interfacing component, a first route advertisement from a first edge node in a Layer-2 (L2) fabric. The first route advertisement may indicate a first route to reach a first host in the L2 fabric. In some examples, the first route may be an asymmetric format route.

At 504, method 500 may include receiving, at the interfacing component, a second route advertisement from a second edge node in a L2/Layer-3 (L3) fabric. The second route advertisement may indicate a second route to reach a second host in the L2/L3 fabric. In some examples, the second edge node may be configured for symmetric integrated routing and bridging (IRB). The second route may be a symmetric formatted route, for instance. In some examples, the interfacing component may be an element of an ethernet virtual private network (EVPN). As such, the interfacing component may function with a hybrid IRB mode, which may include forwarding data between the L2 fabric and the L2/L3 fabric.

At 506, method 500 may include re-originating the first route, to result in a first modified route. The interfacing component may be included as a hop in the first modified route to reach the first host in the L2 fabric. In some examples, the first modified route may be a symmetric format route.

At 508, method 500 may include re-originating the second route, resulting in a second modified route that includes the interfacing component as a hop to reach the second host in the L2/L3 fabric. In some examples, the first modified route and the second modified route may be associated with a tunnel mesh between the L2 fabric and the L2/L3 fabric. The tunnel mesh may represent a full tunnel mesh between potentially all nodes in the L2 fabric and the L2/L3 fabric, for instance.

At 510, method 500 may include receiving data traffic from the first edge node via the first modified route. At 512, method 500 may include forwarding the data traffic to the second edge node via the second modified route.

Figure 6:
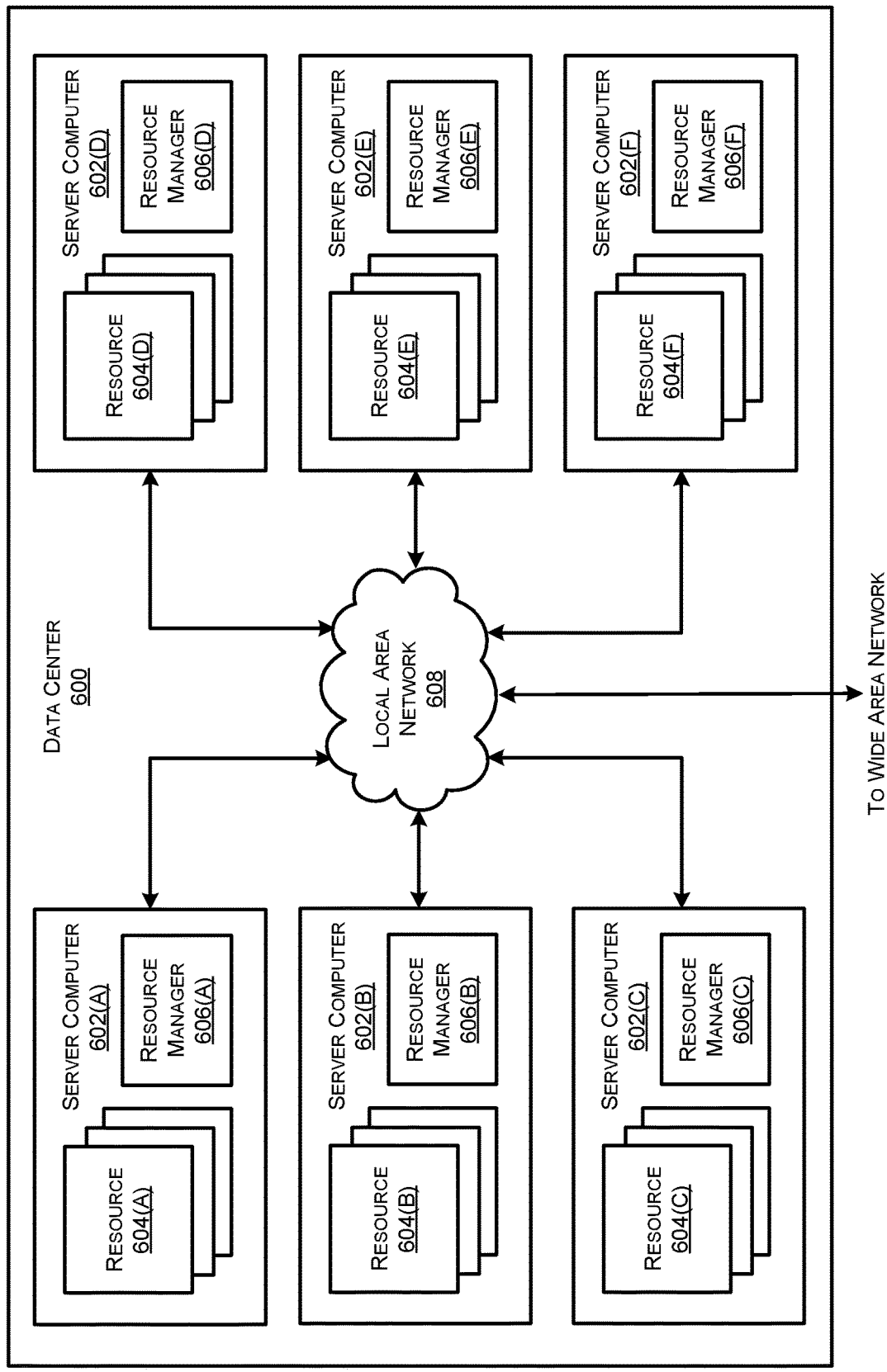
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as an interfacing component (124, 224, or 324), an edge node (106, 206, or 306), and/or a spine node (116, 216, or 316). Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in a network (e.g., network 102, 112, or 130).

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
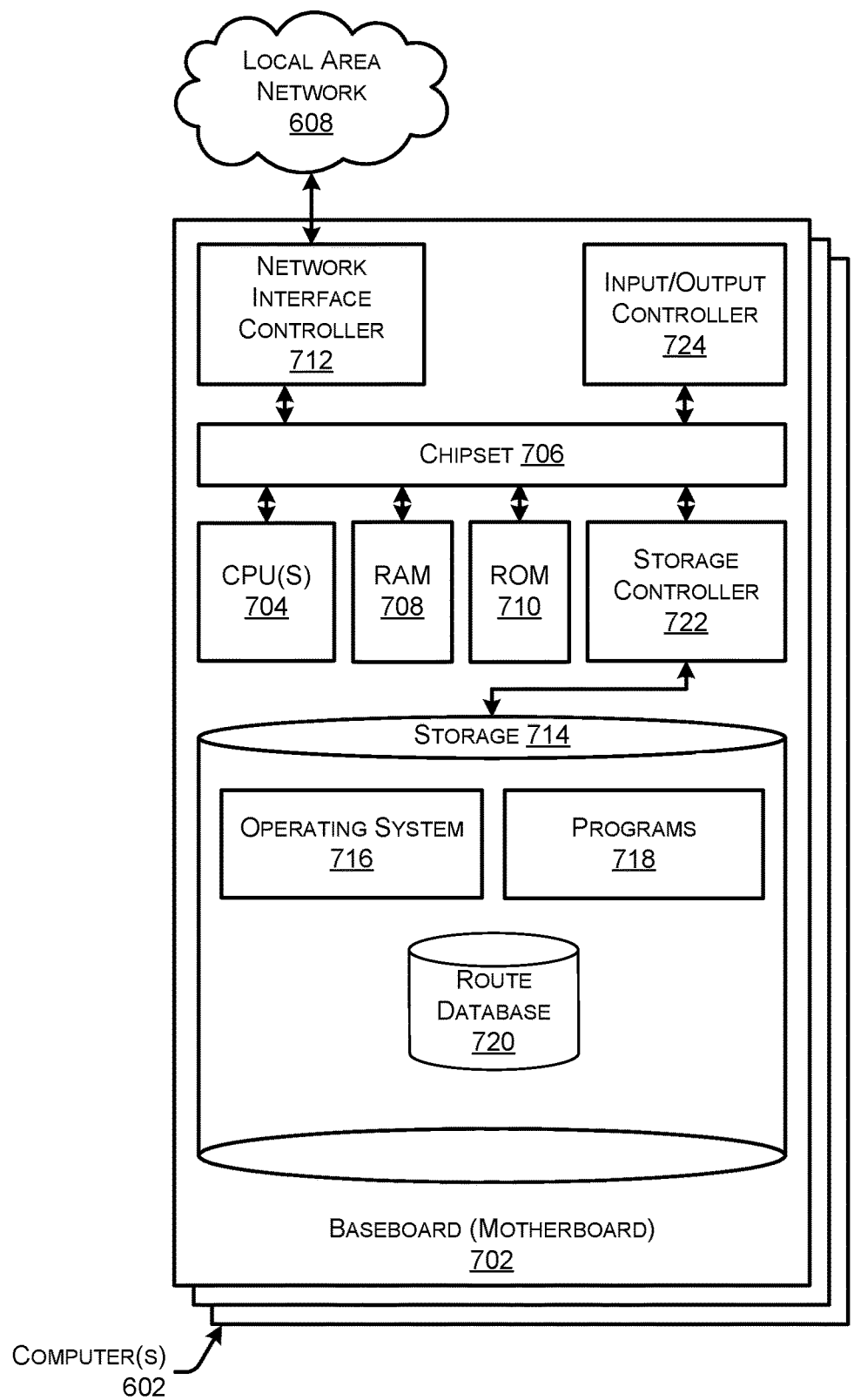
FIG. 7 is a computer architecture diagram showing an illustrative computer hardware architecture for implementing a device that can be utilized to implement aspects of the various technologies presented herein.

FIG. 7 shows an example computer architecture 700 for a computer 602 capable of executing program components for implementing the functionality described above. The computer architecture 700 shown in FIG. 7 illustrates a conventional server computer, workstation, desktop computer, laptop, tablet, network appliance, e-reader, smartphone, and/or other computing device, and can be utilized to execute any of the software components presented herein. The computer 602 may, in some examples, correspond to a physical device described herein (e.g., interfacing component, edge node, a spine node, PE, etc.), and may comprise networked devices such as servers, switches, routers, hubs, bridges, gateways, modems, repeaters, access points, etc. For instance, computer 602 may correspond to interfacing component 124, 224, or 324.

As shown in FIG. 7, the computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the networks 102, 112, 130, and/or 608. The chipset 706 can include functionality for providing network connectivity through a network interface controller (NIC) 712, such as a gigabit Ethernet adapter. The NIC 712 is capable of connecting the computer 602 to other computing devices over the network 608. For instance, in the example shown in FIG. 7, NIC 712 may help facilitate transfer of data, packets, and/or communications over or between networks 102, 112, 130, and/or 608. It should be appreciated that multiple NICs 712 can be present in the computer 602, connecting the computer to other types of networks and remote computer systems.

The computer 602 can be connected to a storage device 714 that provides non-volatile storage for the computer. The storage device 714 can store an operating system 716, programs 718, a route database 720, and/or other data. The storage device 714 can be connected to the computer 602 through a storage controller 722 connected to the chipset 706, for example. The storage device 714 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 714 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 714 is characterized as primary or secondary storage, and the like.

For example, the computer 602 can store information to the storage device 714 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 714 by detecting the physical states or characteristics of one or more particular locations within the physical storage units.

In addition to the mass storage device 714 described above, the computer 602 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 608, and or any components included therein, may be supported by one or more devices similar to computer 602. Stated otherwise, some or all of the operations performed by the network 608, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 714 can store other system or application programs and data utilized by the computer 602.

In one embodiment, the storage device 714 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as an interfacing component (124, 224, or 324), an edge node (106, 206, or 306), and/or a spine node (116, 216, or 316) and/or other devices. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by an interfacing component (124, 224, or 324), an edge node (106, 206, or 306), and/or a spine node (116, 216, or 316), and/or other devices. In some examples, the communications may include data, packet, a route, a route advertisement, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 718 may comprise any type of programs or processes to perform the techniques described in this disclosure in accordance with multiple network interfacing techniques. For instance, the programs 718 may cause the computer 602 to perform techniques for communicating with other devices using any type of protocol or standard usable for determining connectivity. Additionally, the programs 718 may comprise instructions that cause the computer 602 to perform the specific techniques for interfacing among multiple different networks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, at an interfacing component, a first route advertisement from a first edge node in a Layer-2 (L2) fabric, the first route advertisement indicating a first route extending from a first host in the L2 fabric, wherein the first edge node is configured for asymmetric integrated routing and bridging (IRB);
receiving, at the interfacing component, a second route advertisement from a second edge node in a L2/Layer-3 (L3) fabric, the second route advertisement indicating a second route to reach a second host in the L2/L3 fabric, wherein the second edge node is configured for symmetric IRB;
re-originating the first route, by the interfacing component, to result in a first modified route, such that the interfacing component is included as a hop in the first modified route extending from first host in the L2 fabric, wherein the re-originating includes applying a tunnel adjacency rule that defines one or more types of tunnel adjacencies that are permitted to be initiated by the first edge node; and
re-originating the second route, by the interfacing component, to result in a second modified route, such that the interfacing component is included as a hop in the second modified route to reach the second host in the L2/L3 fabric; and
distributing the first modified route into the L2/L3 fabric.

2. The method of claim 1, further comprising:
receiving, at the interfacing component, data traffic from the first edge node via the first modified route.

3. The method of claim 2, further comprising:
determining, at the interfacing component, that the data traffic is intended for the second host; and
based at least in part on the determining that the data traffic is intended for the second host, forwarding, at the interfacing component, the data traffic to the second host via the second modified route.

4. The method of claim 1, further comprising:
distributing the second modified route into the L2 fabric.

5. The method of claim 1, wherein the interfacing component is manifest as an element of the L2/L3 fabric.

6. The method of claim 1, wherein interfacing component comprises a centralized gateway for data traffic for the L2 fabric and the L2/L3 fabric.

7. The method of claim 1, further comprising:
receiving, at the interfacing component, data traffic from the first edge node via the first modified route; and
determining, at the interfacing component, that the data traffic is intended for a third host in the L2 fabric.

8. The method of claim 7, further comprising:
re-originating, at the interfacing component, a third route, to result in a third modified route, such that the interfacing component is included as a hop in the third modified route to reach the third host in the L2 fabric; and
based at least in part on the determining that the data traffic is intended for the third host, forwarding, at the interfacing component, the data traffic to the third host via the third modified route.

9. A networking device comprising:
one or more processors; and
one or more non-transitory computer-readable media storing computer-executable instructions that, when executed by the one or more processors, cause the one or more processors to:
receive a first route advertisement from a first edge node in a Layer-2 (L2) fabric, the first route advertisement indicating a first route extending from a first host in the L2 fabric, wherein the first edge node is configured for asymmetric integrated routing and bridging (IRB);
receive a second route advertisement from a second edge node in a L2/Layer-3 (L3) fabric, the second route advertisement indicating a second route to reach a second host in the L2/L3 fabric, wherein the second edge node is configured for symmetric IRB;
based at least in part on satisfying a tunnel adjacency rule that allows the first edge node to initiate L2 tunnel adjacency with another L2 edge node, re-originate the first route, to result in a first modified route, such that the networking device is included as a hop in the first modified route extending from the first host in the L2 fabric;
re-originate the second route, to result in a second modified route, such that the networking device is included as a hop in the second modified route to reach the second host in the L2/L3 fabric; and
distribute the second modified route into the L2 fabric.

10. The networking device of claim 9, wherein the computer-executable instructions further cause the one or more processors to:
receive data traffic from the first edge node via the first modified route.

11. The networking device of claim 10, wherein the computer-executable instructions further cause the one or more processors to:
determine that the data traffic is intended for the second host.

12. The networking device of claim 11, wherein the computer-executable instructions further cause the one or more processors to:

based at least in part on determining that the data traffic is intended for the second host, forward the data traffic to the second host via the second modified route.

13. The networking device of claim 9, wherein the computer-executable instructions further cause the one or more processors to:
distribute the first modified route into the L2/L3 fabric.

14. The networking device of claim 9, wherein interfacing component comprises a centralized gateway for data traffic for the L2 fabric and the L2/L3 fabric.

15. The networking device of claim 9, wherein the computer-executable instructions further cause the one or more processors to:
receive data traffic from the first edge node via the first modified route; and
determine that the data traffic is intended for a third host in the L2 fabric.

16. The networking device of claim 15, wherein the computer-executable instructions further cause the one or more processors to:
re-originate a third route, to result in a third modified route, such that the networking device is included as a hop in the third modified route to reach the third host in the L2 fabric; and
based at least in part on determining that the data traffic is intended for the third host, forward the data traffic to the third host via the third modified route.

17. A method comprising:
receiving, at an interfacing component, a first route advertisement from a first edge node in a Layer-2 (L2) fabric, the first route advertisement indicating a first route extending from a first host in the L2 fabric, wherein the first edge node is configured for asymmetric integrated routing and bridging (IRM);
receiving, at the interfacing component, a second route advertisement from a second edge node in a L2/Layer-3 (L3) fabric, the second route advertisement indicating a second route to reach a second host in the L2/L3 fabric, wherein the second edge node is configured for symmetric IRB;
establishing a segregated tunnel domain that complies with one or more tunnel adjacency rules;
re-originating the first route, to result in a first modified route of the segregated tunnel domain that includes the interfacing component as a hop in the first modified route extending from the first host in the L2 fabric;
re-originating the second route, to result in a second modified route of the segregated tunnel domain that includes the interfacing component as a hop in the second modified route to reach the second host in the L2/L3 fabric;
receiving data traffic from the first edge node via the first modified route; and
forwarding the data traffic to the second edge node via the second modified route.

18. The method of claim 17, wherein the one or more tunnel adjacency rules are associated with the first edge node or the second edge node.

19. The method of claim 18, wherein the first modified route is a symmetrically formatted route.

20. The method of claim 17, wherein the interfacing component is an element of an ethernet virtual private network (EVPN) and functions with a hybrid IRB mode that includes forwarding data between the L2 fabric and the L2/L3 fabric.

* * * * *